US011148726B2

(12) United States Patent
Kamimura et al.

(10) Patent No.: US 11,148,726 B2
(45) Date of Patent: Oct. 19, 2021

(54) FRONT PILLAR STRUCTURE

(71) Applicant: TOYOTA JIDOSHA KABUSHIKI KAISHA, Aichi-ken (JP)

(72) Inventors: Shinya Kamimura, Toyota (JP); Toshiya Miyashita, Toyota (JP); Koki Ikeda, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 78 days.

(21) Appl. No.: 16/676,437

(22) Filed: Nov. 7, 2019

(65) Prior Publication Data

US 2020/0172168 A1 Jun. 4, 2020

(30) Foreign Application Priority Data

Dec. 3, 2018 (JP) .............................. JP2018-226522

(51) Int. Cl.
*B62D 25/04* (2006.01)
*B62D 25/02* (2006.01)
*B62D 27/02* (2006.01)

(52) U.S. Cl.
CPC ............. *B62D 25/04* (2013.01); *B62D 27/02* (2013.01)

(58) Field of Classification Search
CPC ....... B62D 25/04; B62D 27/02; B62D 27/023
USPC ....... 296/210, 203.01–203.03, 193.06, 96.18
See application file for complete search history.

(56) References Cited

U.S. PATENT DOCUMENTS

| 6,485,089 B2* | 11/2002 | Hanyu | ................. B62D 21/15 |
| | | | 29/897.2 |
| 2011/0248525 A1* | 10/2011 | Lundstroem | ........... B62D 25/04 |
| | | | 296/191 |
| 2016/0368537 A1 | 12/2016 | Toyota | |
| 2017/0240122 A1* | 8/2017 | Terada | ................ B62D 29/043 |

FOREIGN PATENT DOCUMENTS

| EP | 3511230 A1 | | 7/2019 |
| JP | H11-235983 A | | 8/1999 |
| JP | 2013-184659 A | | 9/2013 |
| JP | 2017-7509 A | | 1/2017 |
| JP | 2018/111416 | * | 7/2019 |

* cited by examiner

*Primary Examiner* — Dennis H Pedder
(74) *Attorney, Agent, or Firm* — Hauptman Ham, LLP

(57) ABSTRACT

A front pillar structure includes a front side pillar frame member and rear side pillar frame member that structure a front pillar, a transparent member, a first joining portion and a second joining portion. The transparent member spans between the front side pillar frame member and the rear side pillar frame member and also structures the front pillar. At the first joining portion, an upper end portion of the front side pillar frame member is joined to a roof side rail that is disposed at a vehicle width direction outer side of a roof panel. At the second joining portion, an upper end portion of the rear side pillar frame member is joined to a rail outer panel. The first joining portion and the second joining portion are formed at the vehicle rear side relative to a front end portion of the roof panel.

9 Claims, 7 Drawing Sheets

FRONT PILLAR STRUCTURE

CROSS-REFERENCE TO RELATED APPLICATION

This application is based upon and claims the benefit of priority of the prior Japanese Patent Application No. 2018-226522, filed on Dec. 3, 2018, the entire content of which is incorporated herein by reference.

TECHNICAL FIELD

The present disclosure relates to a front pillar structure.

BACKGROUND ART

A structure in which a triangular window portion is provided at a front pillar to assure a field of view to the side of a vehicle has been known since heretofore (for example, see Japanese Patent Application Laid-Open (JP-A) No. 2013-184659 (Patent Document 1)). In this structure, a front side inclined frame portion is disposed at a front edge side of a triangular window portion, a rear side inclined frame portion is disposed at a rear edge side of the triangular window portion, and a lower side horizontal frame portion is disposed at a lower edge side of the triangular window portion.

A corner portion is formed by a front end portion of a roof side rail disposed at a vehicle width direction outer side of a roof panel and an upper end edge portion at a vehicle rear side of a front pillar. During a front collision of a vehicle, a load applied at the vehicle front side relative to the corner portion (below referred to as a generated load) is large. As a result, a moment that is produced (below referred to as a generated moment) is large. In the structure described above, joining portions of an upper end portion of the front side inclined frame portion and an upper end portion of the rear side inclined frame portion to a roof side rail are formed at the vehicle front side relative to the corner portion (a front end portion of the roof panel in a side view seen in the vehicle width direction).

Because the joining portions of the upper end portion of the front side inclined frame portion and the upper end portion of the rear side inclined frame portion to the roof side rail are a region in which two members are joined to one member, there is an abrupt yield point difference and stress tends to concentrate thereat. Consequently, during a front collision of the vehicle, there is a high possibility of the pillar bending from the joining portions. Thus, there is scope for improvement of a structure that suppresses an occurrence of pillar-bending of a front pillar that includes a triangular window portion.

SUMMARY

Accordingly, an object of the present disclosure is to provide a front pillar structure that, in a front pillar that includes a transparent member between a front side pillar frame member and a rear side pillar frame member, may suppress an occurrence of pillar-bending when a load is applied from the vehicle front side.

A front pillar structure according to a first aspect includes: a front side pillar frame member and a rear side pillar frame member that structure a front pillar; a transparent member that spans between the front side pillar frame member and the rear side pillar frame member and structures the front pillar; a first joining portion at which an upper end portion of the front side pillar frame member is joined to a roof side rail that is disposed at a vehicle width direction outer side of a roof panel; and a second joining portion at which an upper end portion of the rear side pillar frame member is joined to the roof side rail. The first joining portion and the second joining portion are formed at the vehicle rear side relative to a front end portion of the roof panel.

According to the first aspect, the first joining portion, at which the upper end portion of the front side pillar frame member is joined to the roof side rail, and the second joining portion, at which the upper end portion of the rear side pillar frame member is joined to the roof side rail, are formed at the vehicle rear side relative to the front end portion of the roof panel. A generated load when a load is applied from the vehicle front side is smaller at the vehicle rear side relative to the front end portion of the roof panel, and a resulting generated moment is also smaller. Therefore, even at the first joining portion and second joining portion at which stresses tend to concentrate, an occurrence of pillar-bending from the first joining portion and the second joining portion is suppressed.

A front pillar structure according to a second aspect includes: a front side pillar frame member and a rear side pillar frame member that structure a front pillar; a transparent member that spans between the front side pillar frame member and the rear side pillar frame member and structures the front pillar; a first joining portion at which an upper end portion of the front side pillar frame member is joined to a roof side rail that is disposed at a vehicle width direction outer side of a roof panel; a second joining portion at which an upper end portion of the rear side pillar frame member is joined to the roof side rail; and a connecting member that connects the front side pillar frame member with the rear side pillar frame member at a location at which at least a vehicle rear side end portion of the connecting member overlaps in the vehicle front-and-rear direction with a front end portion of the roof panel. The first joining portion and the second joining portion are formed at the vehicle rear side relative to the connecting member.

According to the second aspect, the front side pillar frame member and rear side pillar frame member are connected by the connecting member of which at least the vehicle rear side end portion overlaps with the front end portion of the roof panel in the vehicle front-and-rear direction. The first joining portion, at which the upper end portion of the front side pillar frame member is joined to the roof side rail, and the second joining portion, at which the upper end portion of the rear side pillar frame member is joined to the roof side rail, are formed at the vehicle rear side relative to the connecting member. A generated load when a load is applied from the vehicle front side is smaller at the vehicle rear side relative to the connecting member, and a resulting generated moment is also smaller. Therefore, even at the first joining portion and second joining portion at which stresses tend to concentrate, an occurrence of pillar-bending from the first joining portion and the second joining portion is suppressed.

In a front pillar structure according to a third aspect, in the front pillar structure according to the first aspect or the second aspect, the first joining portion and the second joining portion are formed at the vehicle front side relative to an upper end edge portion at the vehicle front side of a center pillar.

According to the third aspect, the first joining portion and second joining portion are formed at the vehicle front side relative to the upper end edge portion at the vehicle front side of the center pillar. That is, the first joining portion and second joining portion are formed between the front end portion of the roof panel, or the connecting member, and the front end edge portion at the vehicle front side of the center pillar. Therefore, compared to a structure in which a first joining portion and second joining portion are formed at the vehicle rear side relative to an upper end edge portion at the vehicle front side of a center pillar, an increase in weight of the vehicle is suppressed.

In a front pillar structure according to a fourth aspect, in the front pillar structure according to the first aspect, the first joining portion and the second joining portion are formed at a substantially central portion in the vehicle front-and-rear direction of the roof side rail between the front end portion of the roof panel and an upper end edge portion at the vehicle front side of a center pillar.

According to the fourth aspect, the first joining portion and second joining portion are formed at the central portion in the vehicle front-and-rear direction of the rail outer panel between the front end portion of the roof panel and the upper end edge portion at the vehicle front side of the center pillar. Thus, a good balance is found between suppressing an occurrence of pillar-bending from the first joining portion and second joining portion and suppressing an increase in weight of the vehicle.

In a front pillar structure according to a fifth aspect, in the front pillar structure according to the second aspect, the first joining portion and the second joining portion are formed at a substantially central portion in the vehicle front-and-rear direction of the roof side rail between the connecting member and an upper end edge portion at the vehicle front side of a center pillar.

According to the fifth aspect, the first joining portion and second joining portion are formed at the central portion in the vehicle front-and-rear direction of the rail outer panel between the connecting member and the upper end edge portion at the vehicle front side of the center pillar. Thus, a good balance is found between suppressing an occurrence of pillar-bending from the first joining portion and second joining portion and suppressing an increase in weight of the vehicle.

According to the present disclosure as described above, in a front pillar that includes a transparent member between a front side pillar frame member and a rear side pillar frame member, an occurrence of pillar-bending when a load is applied from the vehicle front side may be suppressed.

DETAILED DESCRIPTION

Figure 1:
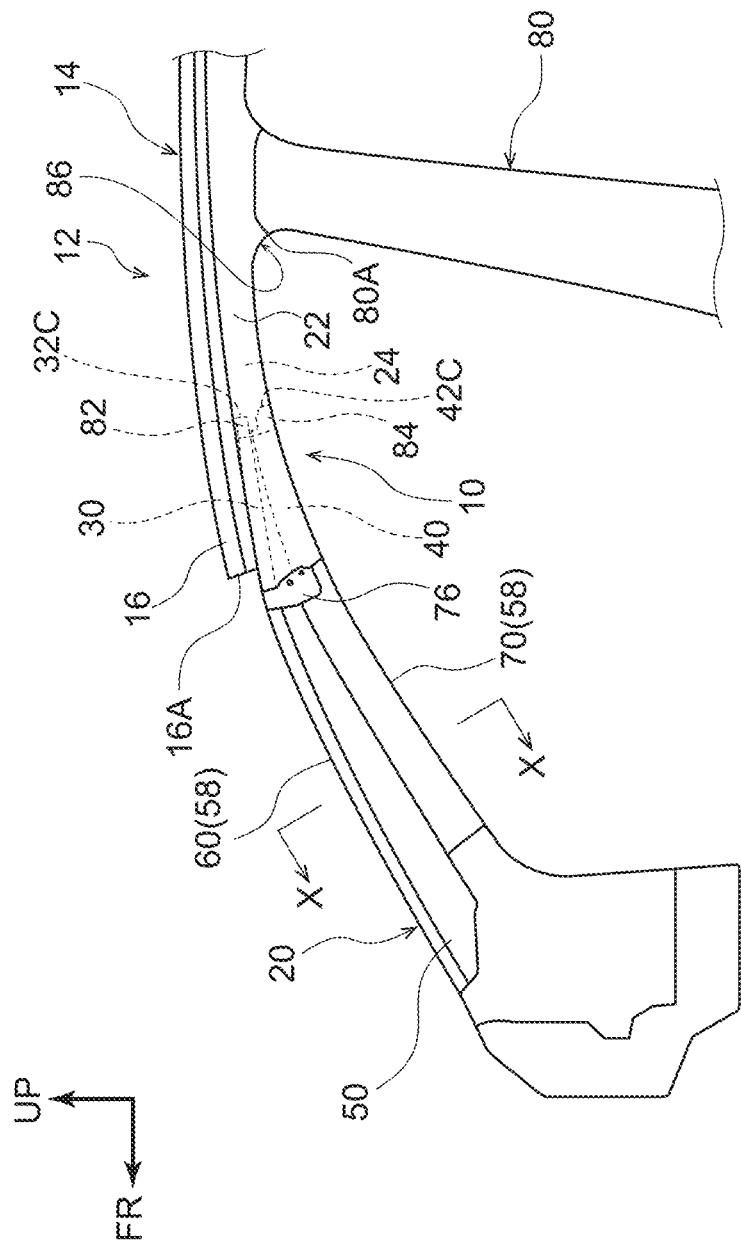
FIG. 1 is a side view showing a front pillar structure according to a present exemplary embodiment.

Herebelow, an exemplary embodiment relating to the present disclosure is described in detail in accordance with the drawings. For convenience of description, the arrow UP that is shown where appropriate in the drawings indicates a vehicle upper direction, the arrow FR indicates a vehicle front direction, and the arrow RH indicates a vehicle right direction. Thus, in the following descriptions, where the directions upper and lower, front and rear, and left and right are recited without being particularly specified, the same represent upper and lower in the vehicle vertical direction, front and rear in the vehicle front-and-rear direction, and left and right in the vehicle left-and-right direction (the vehicle width direction).

Figure 2:
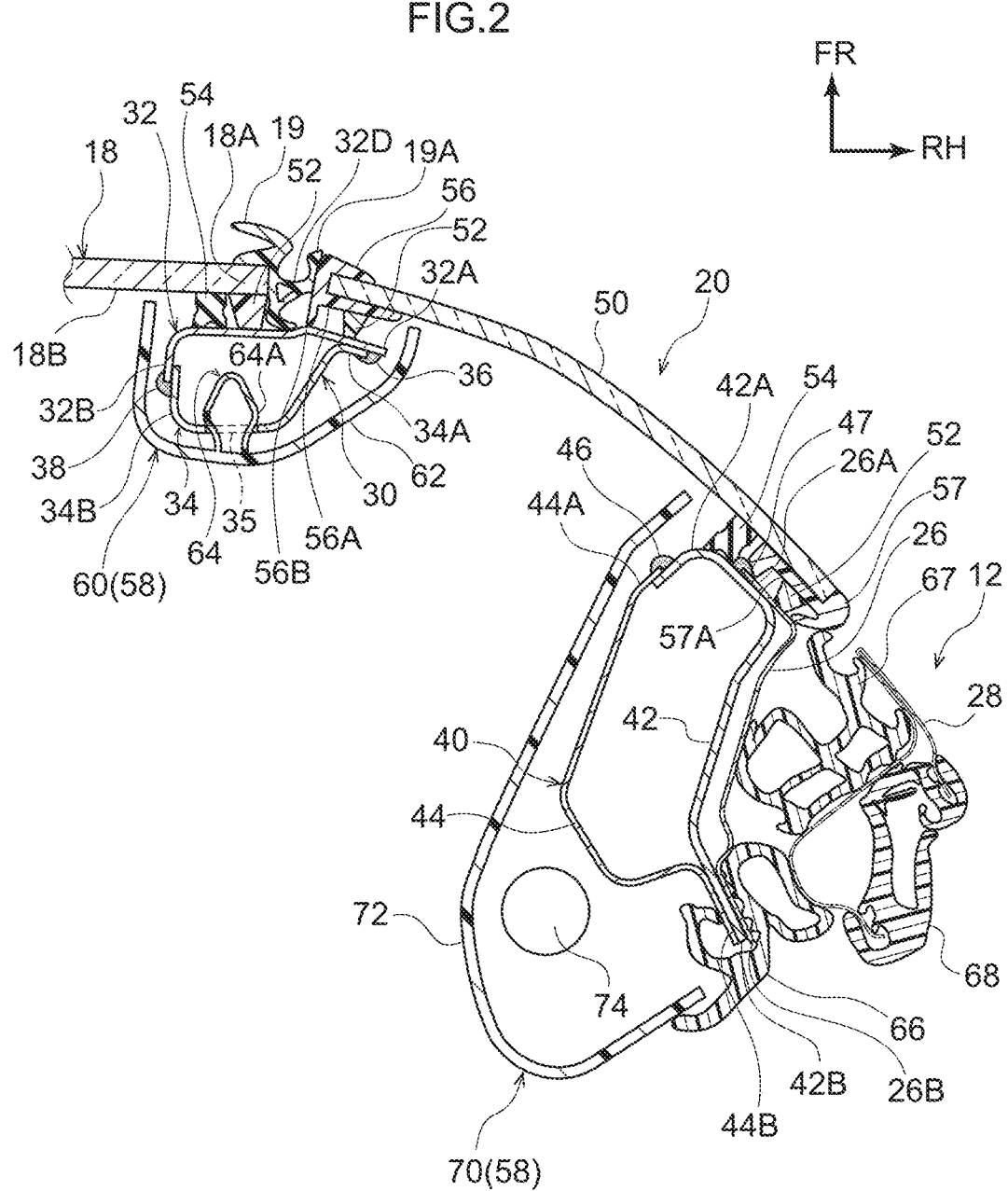
FIG. 2 is a sectional diagram cut along line X-X in FIG. 1.

As shown in FIG. 2, a front windshield glass (below referred to as "the front glass") 18 is provided at a vehicle 12. The front glass 18 is inclined to the vehicle rear side toward the vehicle upper side and separates the inside of a passenger compartment from the outside of the passenger compartment. An upper end portion of the front glass 18 is connected to a front header (not shown in the drawings) that is disposed at a front end portion 16A of a roof panel 16 that structures a roof 14 (see FIG. 1).

Figure 3:
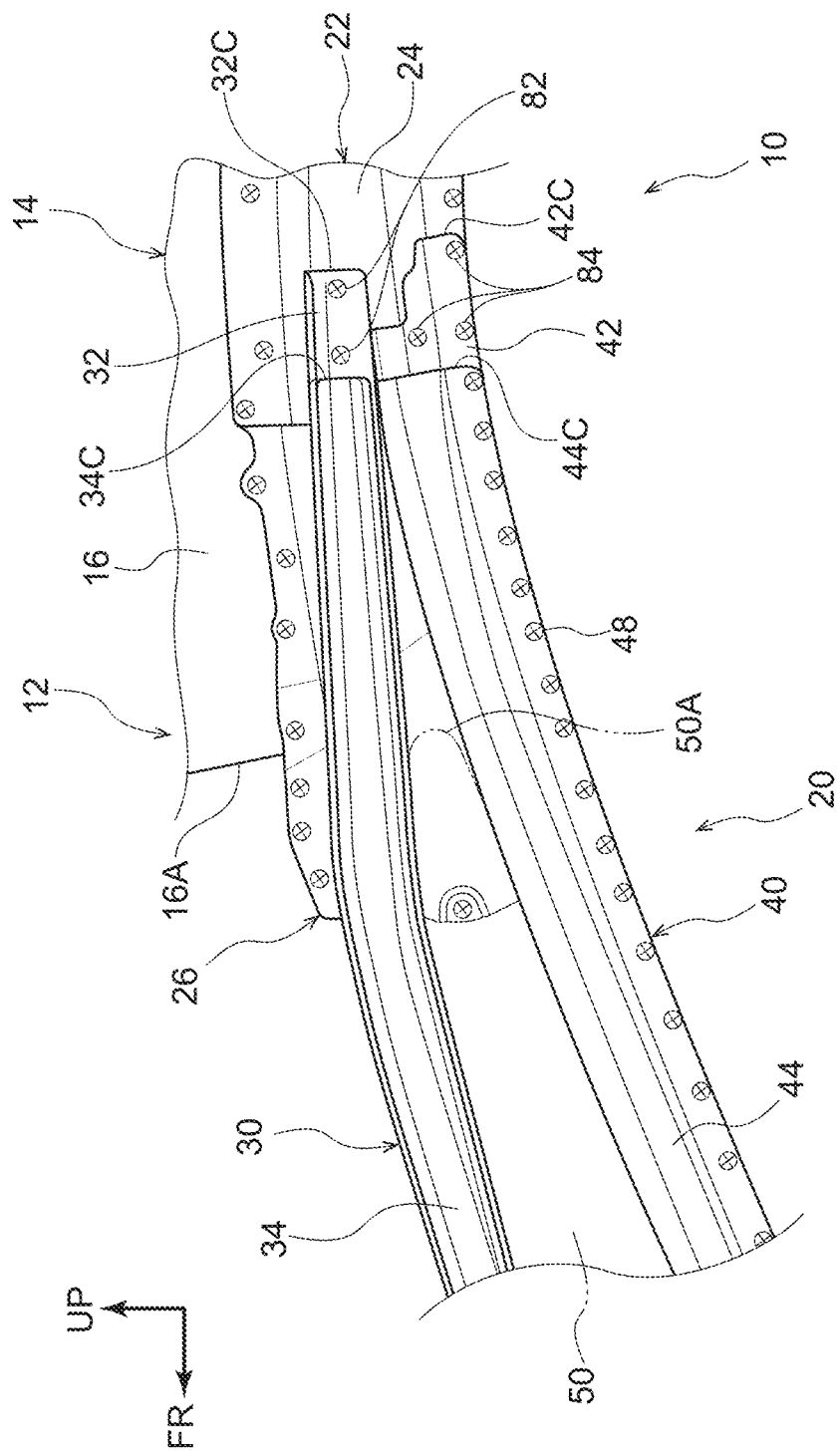
FIG. 3 is a partial magnified side view showing the front pillar structure according to the present exemplary embodiment without a bracket.

As shown in FIG. 3, a roof side rail 22 is disposed at each vehicle width direction outer side end portion of the roof 14. The roof side rail 22 extends in the vehicle front-and-rear direction. The roof side rail 22 is formed in a chamber shape by respective flange portions of a rail inner panel (not shown in the drawings) and a rail outer panel 24 being joined together. A side member outer panel (below referred to as "the side member outer") 26 is disposed at the vehicle width direction outer side of the rail outer panel 24.

As shown in FIG. 1, a left and right pair of front pillars (below referred to as "the A pillars") 20 are provided at the vehicle width direction outer sides of the front glass 18. A front pillar structure 10 according to the present exemplary embodiment is employed at each A pillar 20. The left and right pair of A pillars 20 extend along respective vehicle width direction outer side end portions 18A (see FIG. 2) of the front glass 18, with length directions of the A pillars 20 substantially in the vehicle vertical direction.

That is, the left and right pair of A pillars 20 are each inclined to the vehicle rear side toward the vehicle upper side. The A pillars 20 have the same structures at the left side (for example, a front passenger seat side) and the right side (for example, a driver seat side) with left-and-right mirror symmetry. Accordingly, only the A pillar 20 at the right side is described below.

As shown in FIG. 2, the A pillar 20 includes a front column 30 that serves as a front side pillar frame member and a rear column 40 that serves as a rear side pillar frame member. The front column 30 extends substantially in the vehicle vertical direction. The front column 30 includes a front side pillar outer panel 32 fabricated of steel plate and a front side pillar inner panel 34 fabricated of steel plate.

The front column 30 is formed in a chamber shape by the front side pillar outer panel 32 and the front side pillar inner panel 34. That is, the front side pillar inner panel 34 is provided substantially at the vehicle rear side of the front side pillar outer panel 32 to oppose the front side pillar outer panel 32, and the front side pillar outer panel 32 and front side pillar inner panel 34 are joined together by linear welding such as arc welding, laser welding or the like.

To describe this in more detail, an outer side flange portion 32A is a vehicle width direction outer side end portion of the front side pillar outer panel 32, and an outer side flange portion 34A is a vehicle width direction outer side end portion of the front side pillar inner panel 34. The outer side flange portion 32A and outer side flange portion 34A are superposed with one another and the superposed portions are linearly welded. That is, a predetermined gap in the length direction is left open between the outer side flange portion 32A and the outer side flange portion 34A, and plural linear weld portions 36 are formed in the gap.

Meanwhile, an inner side flange portion 32B is a vehicle width direction inner side end portion of the front side pillar outer panel 32, and an inner side flange portion 34B is a vehicle width direction inner side end portion of the front side pillar inner panel 34. The inner side flange portion 32B and inner side flange portion 34B are superposed with one another and the superposed portions are linearly welded. That is, a predetermined gap in the length direction is left open between the inner side flange portion 32B and the inner side flange portion 34B, and plural linear weld portions 38 are formed in the gap.

The vehicle width direction outer side end portion 18A of the front glass 18 is joined to the front column 30 via a urethane adhesive 52 and a cushioning rubber 54. To describe this in more detail, a flat surface portion 32D that is oriented to the vehicle front side is formed at the front side pillar outer panel 32 structuring the front column 30. The outer side flange portion 32A is continuous with the vehicle width direction outer side of the flat surface portion 32D. In other words, the outer side flange portion 32A is a portion of the flat surface portion 32D.

The urethane adhesive 52 is provided at an inner face 18B of the vehicle width direction outer side end portion 18A of the front glass 18. The inner face 18B is oriented to the passenger compartment side. The cushioning rubber 54 is provided for positioning at the vehicle width direction inner side of the inner face 18B relative to the urethane adhesive 52. The cushioning rubber 54 is provided in contact with the urethane adhesive 52. Thus, while the vehicle width direction outer side end portion 18A of the front glass 18 is positioned relative to the flat surface portion 32D of the front side pillar outer panel 32 by the cushioning rubber 54, the vehicle width direction outer side end portion 18A is joined to the flat surface portion 32D from the vehicle front side thereof by the urethane adhesive 52.

The rear column 40 is disposed substantially at the vehicle rear side of the front column 30. That is, the rear column 40 is disposed substantially in the vehicle rear direction from the front column 30 with a predetermined gap therebetween and extends substantially in parallel with the front column 30 (substantially in the vehicle vertical direction). The rear column 40 includes a rear side pillar outer panel 42 fabricated of steel plate and a rear side pillar inner panel 44 fabricated of steel plate.

The rear column 40 is formed in a chamber shape by the rear side pillar outer panel 42 and the rear side pillar inner panel 44. That is, the rear side pillar inner panel 44 is provided substantially at the vehicle width direction inner side of the rear side pillar outer panel 42 to oppose the rear side pillar outer panel 42, and the rear side pillar outer panel 42 and rear side pillar inner panel 44 are joined together by linear welding and spot welding such as arc welding, laser welding or the like.

To describe this in more detail, a front side flange portion 42A is a vehicle front side end portion of the rear side pillar outer panel 42, and a front side flange portion 44A is a vehicle front side end portion of the rear side pillar inner panel 44. The front side flange portion 42A and front side flange portion 44A are superposed with one another and the superposed portions are linearly welded. That is, a predetermined gap in the length direction is left open between the front side flange portion 42A and the front side flange portion 44A, and plural linear weld portions 46 are formed in the gap.

Meanwhile, a rear side flange portion 42B is a vehicle rear side end portion of the rear side pillar outer panel 42, and a rear side flange portion 44B is a vehicle rear side end portion of the rear side pillar inner panel 44. The rear side flange portion 42B and rear side flange portion 44B are superposed with one another and the superposed portions are spot welded. That is, a predetermined gap in the length direction is left open between the rear side flange portion 42B and the rear side flange portion 44B, and plural spot weld portions 48 are formed in the gap (see FIG. 3).

The side member outer 26 is disposed at the vehicle width direction outer side of the rear side pillar outer panel 42. A front side flange portion 26A of the side member outer 26 covers the rear side pillar outer panel 42. The front side flange portion 26A is linearly welded to a wall face at the front side of the rear side pillar outer panel 42 by arc welding, laser welding or the like. That is, linear weld portions 47 are formed at the front side flange portion 26A and the wall face at the front side of the rear side pillar outer panel 42.

A rear side flange portion 26B of the side member outer 26 covers the rear side pillar outer panel 42. The rear side flange portion 26B is spot welded to the rear side flange portion 42B. The rear side flange portion 26B of the side member outer 26, the rear side flange portion 42B and the rear side flange portion 44B are superposed with one another, and an opening weatherstrip 66 fabricated of resin (fabricated of rubber) is attached to the rear side flange portion 26B, rear side flange portion 42B and rear side flange portion 44B by being tightly fitted thereto substantially from the vehicle rear side.

An A pillar glass 50 that serves as a transparent member spans between the front column 30 and the rear column 40, via pillar glass moldings 56 and 57, which are described below, the cushioning rubber 54 and the urethane adhesive 52. The A pillar glass 50 is a transparent window member with a plate thickness direction substantially in the vehicle width direction. In the side view (see FIG. 1), the A pillar glass 50 is inclined to the vehicle rear side toward the vehicle upper side.

The pillar glass molding 56, which is fabricated of resin (fabricated of rubber), is integrally attached to a front end portion of the A pillar glass 50. A protrusion portion 56B that serves as a positioning portion is integrally formed at the vehicle width direction inner side of a wall face 56A of the pillar glass molding 56 that is oriented to the passenger compartment side thereof. Another of the urethane adhesive 52 is attached at the vehicle width direction outer side of the protrusion portion 56B.

The pillar glass molding 57, which is fabricated of resin (fabricated of rubber), is integrally attached to a rear end portion of the A pillar glass 50. Still another of the urethane adhesive 52 is attached to the vehicle rear side of a wall face 57A of the pillar glass molding 57 that is oriented to the vehicle rear side. Another of the cushioning rubber 54 is attached to the vehicle front side of the wall face 57A.

Accordingly, at the front end portion of the A pillar glass 50, while the pillar glass molding 56 is positioned at the outer side flange portion 32A (the flat surface portion 32D) from the vehicle front side by the protrusion portion 56B, the pillar glass molding 56 is attached to the front column 30 by being joined by the urethane adhesive 52. At the rear end portion of the A pillar glass 50, while the pillar glass molding 57 is positioned at the front side flange portion 42A from the vehicle width direction outer side by the cushioning rubber 54, the pillar glass molding 57 is joined to the front side flange portion 26A of the side member outer 26 by the urethane adhesive 52, and the glass molding 57 is attached to the rear column 40 via the front side flange portion 26A of the side member outer 26.

A molding 19 fabricated of resin (fabricated of rubber) that serves as a sealing member is provided at the vehicle width direction outer side end portion 18A of the front glass 18. A vehicle width direction outer side end portion 19A of the molding 19 is abutted against the pillar glass molding 56 in a resiliently deformed state (with a predetermined pressure). Thus, the ingression of rainwater and the like between the A pillar glass 50 and the front glass 18 is prevented by the molding 19 being provided between the vehicle width direction outer side end portion 18A of the front glass 18 and the pillar glass molding 56.

A door frame 28 of a front door (not shown in the drawings) is disposed at the vehicle width direction outer side of the rear side pillar outer panel 42. A door weatherstrip 67 is provided at the vehicle front side of the door frame 28. A glass run 68 is provided at the vehicle rear side of the door frame 28. The A pillar glass 50 is not limited to being formed of glass but may be formed of, for example, a transparent fiber-reinforced resin or the like.

A pillar garnishes 58 are provided at the vehicle width direction inner sides of the front column 30 and the rear column 40. The A pillar garnishes 58 are fabricated of resin. The A pillar garnishes 58 include a front side pillar garnish 60 provided at the passenger compartment side of the front column 30 and a rear side pillar garnish 70 provided at the passenger compartment side of the rear column 40.

The front side pillar garnish 60 includes a main body portion 62 that extends along the front column 30 substantially in the vehicle vertical direction. A cross section of the main body portion 62 intersecting the length direction thereof (in a plan sectional view) is formed substantially in a "U" shape that opens toward the vehicle front side. The main body portion 62 covers the front column 30 from the passenger compartment side thereof in a non-contacting state.

Plural clips 64 are provided at an inner face of the main body portion 62, spaced by a predetermined spacing along the length direction of the main body portion 62. Each clip 64 is formed substantially in an arrowhead shape including a wide breadth portion 64A at a distal end side thereof. The clips 64 (wide breadth portions 64A) are formed to be resiliently deformable in a direction intersecting the projection direction thereof. The clips 64 (wide breadth portions 64A) project from the inner face of the main body portion 62 so as to be opposable with the front side pillar inner panel 34.

Penetrating holes 35 are formed in the front side pillar inner panel 34. Inner breadths of the penetrating holes 35 are formed to be a little smaller than outer breadths of the wide breadth portions 64A. Thus, the front side pillar garnish 60 is attached to the front column 30 by the wide breadth portions 64A of the clips 64 being resiliently deformed and inserted into the penetrating holes 35, after which the wide breadth portions 64A restore shape.

The rear side pillar garnish 70 includes a main body portion 72 that extends along the rear column 40 substantially in the vehicle vertical direction. A cross section of the main body portion 72 intersecting the length direction thereof (in a plan sectional view) is formed substantially in a "U" shape that opens toward the vehicle width direction outer side. The main body portion 72 covers the rear column 40 from the passenger compartment side thereof in a non-contacting state.

Clips (not shown in the drawings) similar to the clips 64 described above are provided at an inner face of the rear side pillar garnish 70. The rear side pillar garnish 70 is attached to the rear column 40 by these clips. A wire harness 74 is arranged between the rear column 40 and the rear side pillar garnish 70.

As shown in FIG. 3, at an upper end portion of the front column 30, an upper end portion 32C of the front side pillar outer panel 32 extends further to the vehicle rear side than an upper end portion 34C of the front side pillar inner panel 34. At an upper end portion of the rear column 40, an upper end portion 42C of the rear side pillar outer panel 42 extends further to the vehicle rear side than an upper end portion 44C of the rear side pillar inner panel 44.

The upper end portion 32C of the front side pillar outer panel 32 and the upper end portion 42C of the rear side pillar outer panel 42 are each joined by spot welding to the rail outer panel 24, at the vehicle rear side relative to the front end portion 16A of the roof panel 16 in side view but at the vehicle front side relative to an upper end edge portion 80A at the vehicle front side of a center pillar (below referred to as "the B pillar") 80 (see FIG. 1).

To describe this in more detail, a first joining portion 82 and a second joining portion 84 are formed at the rail outer panel 24 between the front end portion 16A of the roof panel 16 and the upper end edge portion 80A of the B pillar 80. The first joining portion 82 is formed by the upper end portion 32C of the front side pillar outer panel 32 being bonded (joined) to the rail outer panel 24 by spot welds at plural locations. The second joining portion 84 is formed by the upper end portion 42C of the rear side pillar outer panel 42 being bonded (joined) to the rail outer panel 24 by spot welds at plural locations.

It is more preferable if the first joining portion 82 and second joining portion 84 are formed at a substantially central portion in the vehicle front-and-rear direction of the rail outer panel 24 (a substantial middle position) between the front end portion 16A of the roof panel 16 (or a rear end portion 76A of a bracket 76 that is described below) and the upper end edge portion 80A of the B pillar 80.

The upper end portion 32C of the front side pillar outer panel 32 is joined to the rail outer panel 24 (at the first joining portion 82) by spot welding at two locations, and the upper end portion 42C of the rear side pillar outer panel 42 is joined to the rail outer panel 24 (at the second joining portion 84) by spot welding at three locations.

As shown in FIG. 3, the front end portion 16A of the roof panel 16 is disposed at substantially the same position in the vehicle front-and-rear direction as an upper end edge portion 50A of the A pillar glass 50. That is, proceeding from the vehicle front side toward the vehicle rear side, a region in which the A pillar glass 50 terminates is also a region in which the roof 14 begins. As shown in FIG. 1, the upper end edge portion 80A at the vehicle front side of the B pillar 80 can also be regarded as a corner portion 86 (a vertex portion) at the vehicle front side where the B pillar 80 and the roof side rail 22 intersect.

Figure 4:
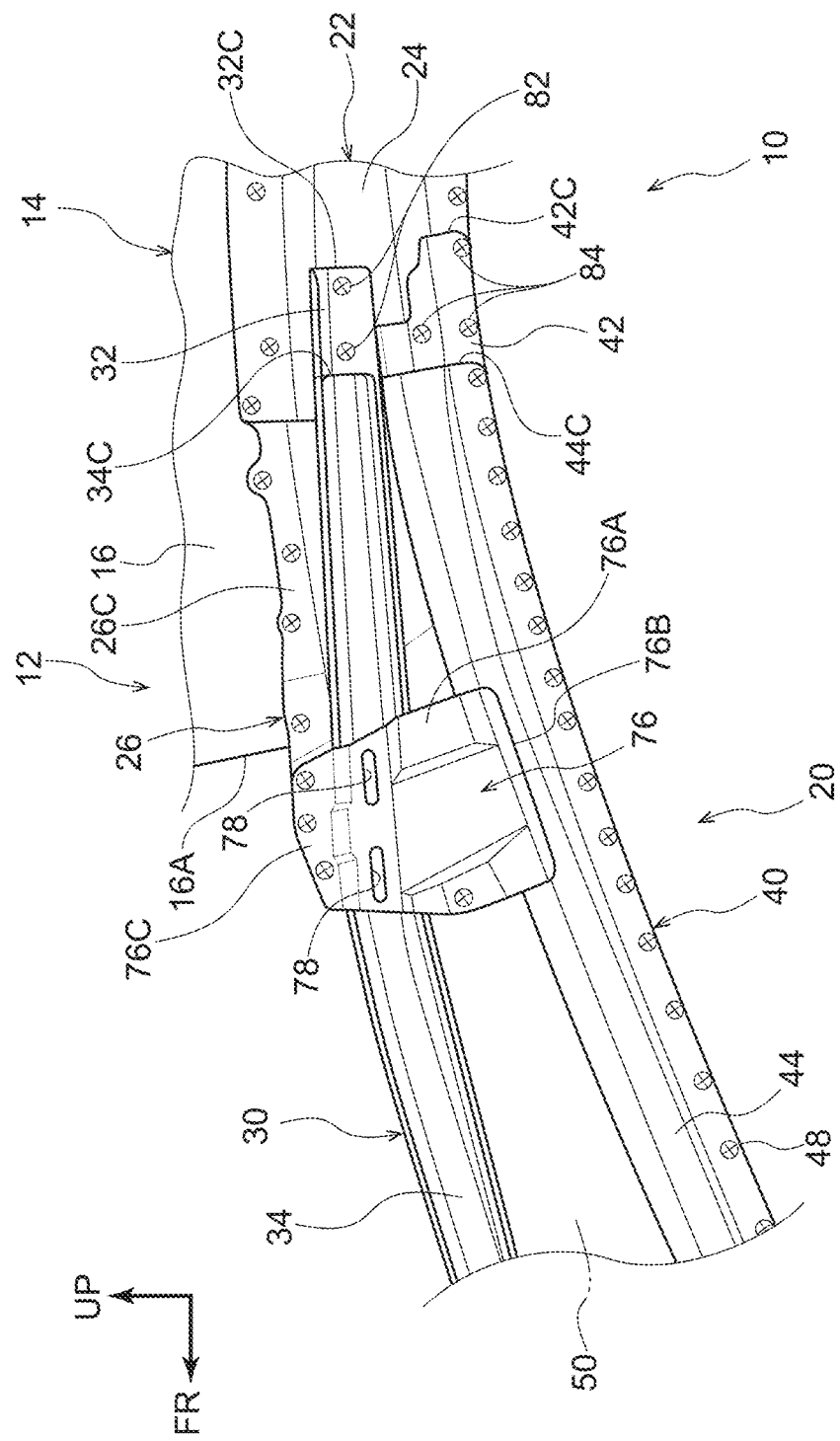
FIG. 4 is a partial magnified side view showing the front pillar structure according to the present exemplary embodiment with a bracket.

As shown in FIG. 4, the bracket 76 may serve as a connecting member spanning between the front column 30 and the rear column 40 (FIG. 1 depicts a structure in which the bracket 76 is included). The bracket 76 connects the front column 30 with the rear column 40 in a region in which at least the rear end portion 76A of the bracket 76 overlaps in plan view with the front end portion 16A of the roof panel 16 in the vehicle front-and-rear direction. The bracket 76 covers the upper end edge portion 50A (see FIG. 3) of the A pillar glass 50 from the vehicle width direction inner side thereof.

Slit portions 78 with length directions in the front-and-rear direction are formed at two locations in an upper portion of the bracket 76. Peripheral edge portions of the slit portions 78 are joined to the front side pillar inner panel 34 of the front column 30 by linear welding such as arc welding, laser welding or the like. A lower end edge portion 76B of the bracket 76 is bonded to the rear side pillar inner panel 44 of the rear column 40 by linear welding such as arc welding, laser welding or the like. An upper end portion 76C of the bracket 76 is bonded to an upper side flange portion 26C of the side member outer 26 by spot welding at three locations.

Now, operation of the front pillar structure 10 according to the present exemplary embodiment with the structure described above is described.

Figure 7:
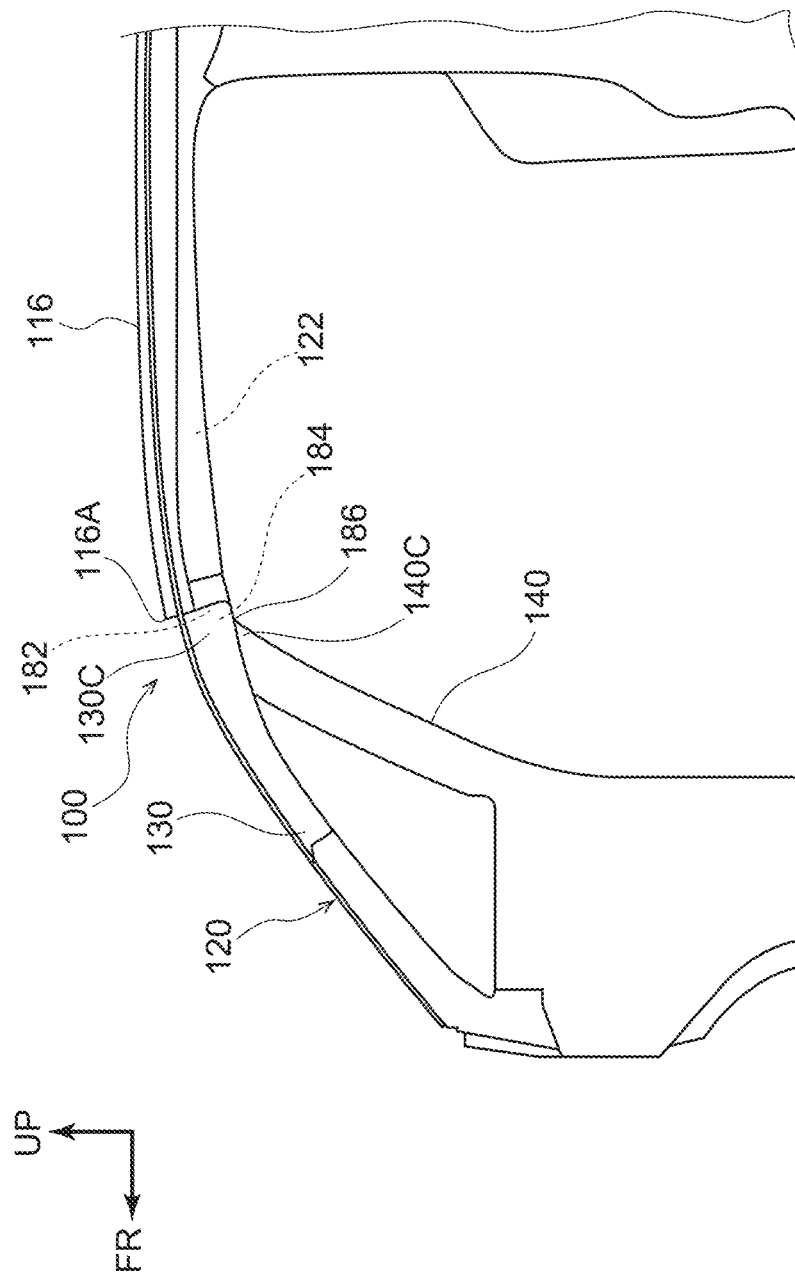
FIG. 7 is a side view showing a front pillar structure according to a comparative example.

First, a front pillar structure 100 according to a comparative example, which is shown in FIG. 7, is described. At an A pillar 120, a roof side rail 122 is disposed at a vehicle width direction outer side of a roof panel 116. As shown in FIG. 7, a corner portion 186 with an obtuse angle shape in side view is formed by a front end portion of the roof side rail 122 and an upper end portion 140C of a rear column 140.

An upper end portion 130C of a front column 130 is joined to the roof side rail 122 (in a vicinity of the corner portion 186) at the vehicle front side relative to a front end portion 116A of the roof panel 116. That is, joining portions 182 and 184 of the upper end portion 130C of the front column 130 and the upper end portion 140C of the rear column 140 to the roof side rail 122 are both formed at the vehicle front side relative to the front end portion 116A of the roof panel 116.

Figure 5:
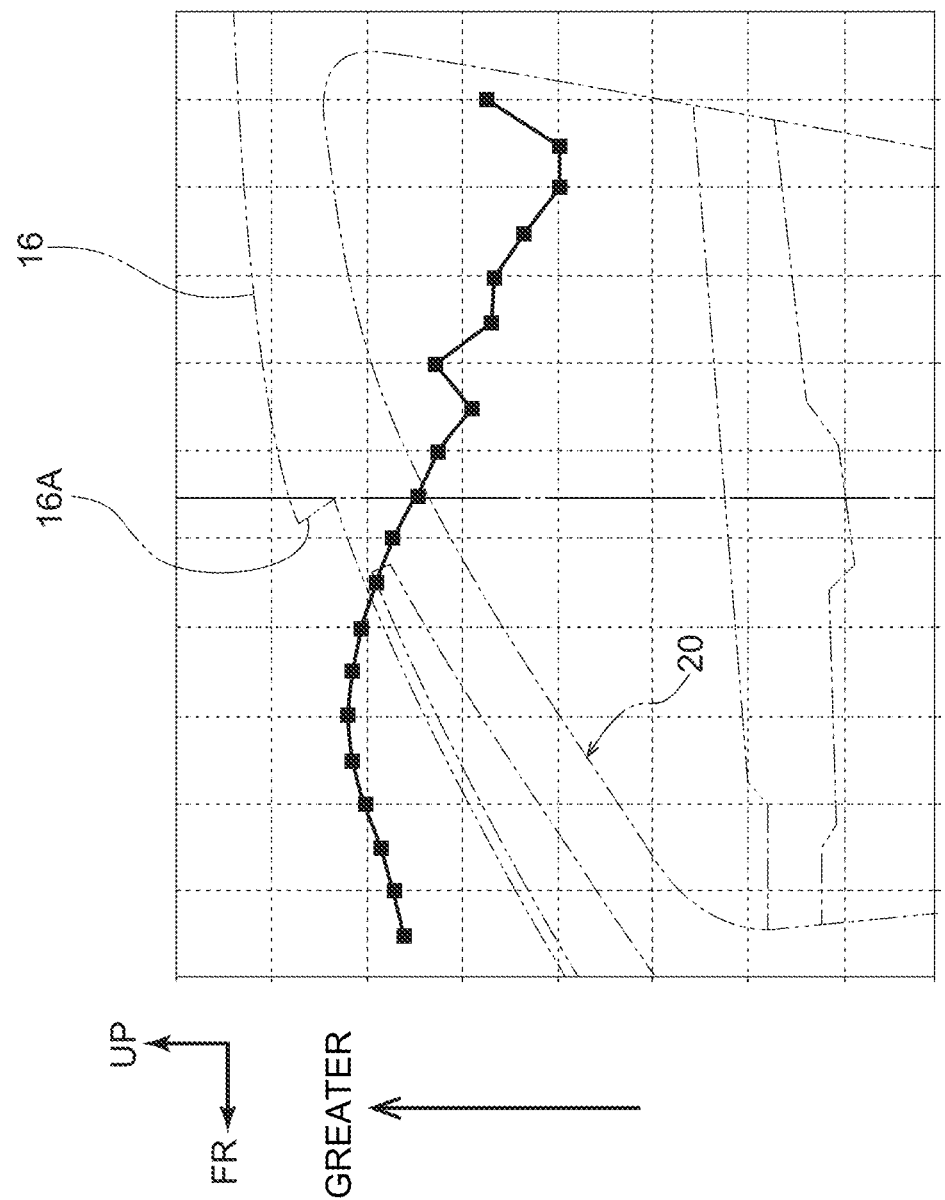
FIG. 5 is a graph showing generated load during a front collision of a vehicle equipped with the front pillar structure according to the present exemplary embodiment.
Figure 6:
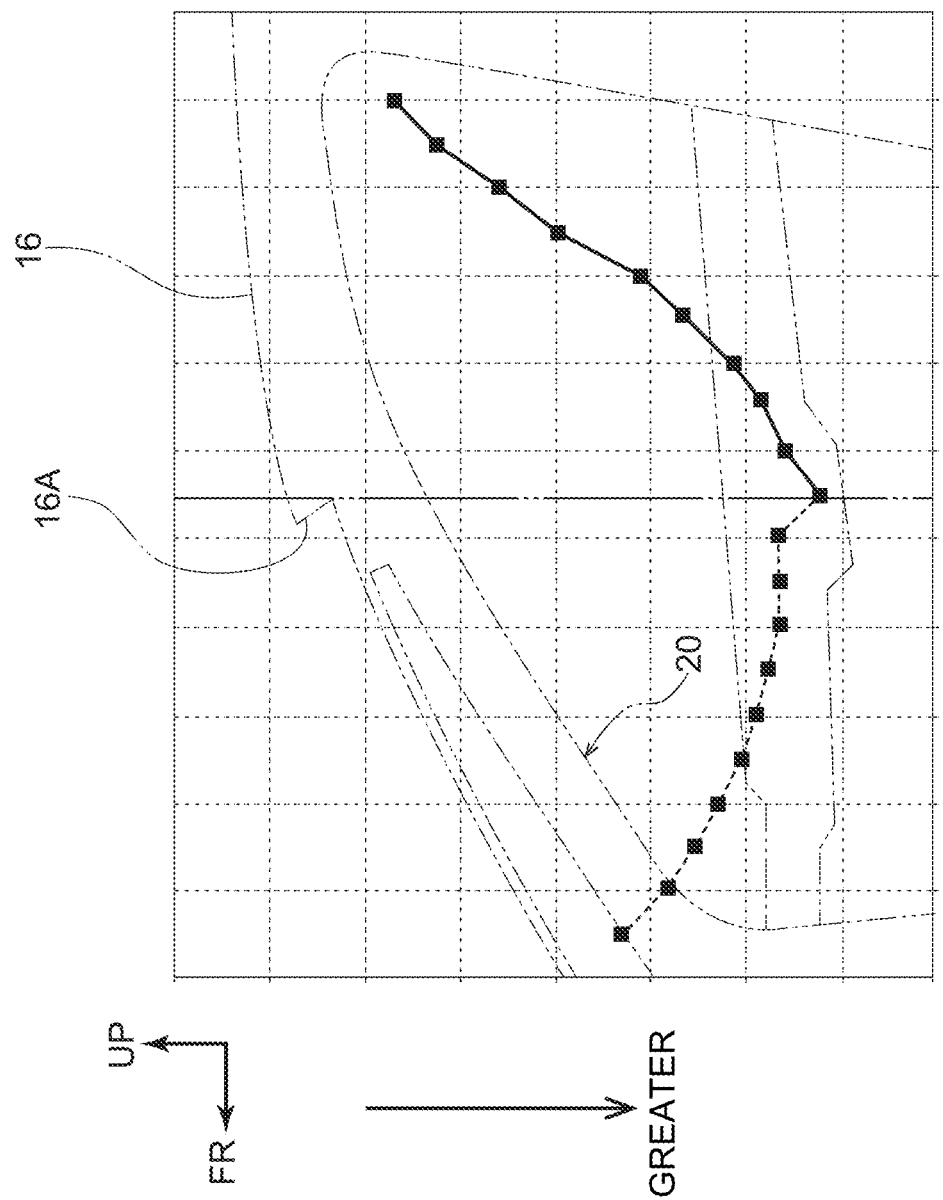
FIG. 6 is a graph showing generated moment during the front collision of the vehicle equipped with the front pillar structure according to the present exemplary embodiment.

During a front collision of the vehicle 12 (when a load is applied from the vehicle front side), a generated load at the vehicle front side relative to the corner portion 186 (and the front end portion 116A of the roof panel 116) is large, as a result which a generated moment is large (see FIG. 5 and FIG. 6). Consequently, during the front collision of the vehicle 12, pillar-bending may occur at the A pillar 120, with the origin of the bending being the corner portion 186.

In contrast, in the front pillar structure 10 according to the present exemplary embodiment, as shown in FIG. 3, the upper end portion 32C of the front side pillar outer panel 32 that structures the front column 30 and the upper end portion 42C of the rear side pillar outer panel 42 that structures the rear column 40 are both joined to the rail outer panel 24 of the roof side rail 22 at the vehicle rear side relative to the front end portion 16A of the roof panel 16.

In other words, the first joining portion 82 at which the upper end portion 32C of the front side pillar outer panel 32 is joined to the rail outer panel 24 and the second joining portion 84 at which the upper end portion 42C of the rear side pillar outer panel 42 is joined to the rail outer panel 24 are formed at the vehicle rear side relative to the front end portion 16A of the roof panel 16.

As illustrated in FIG. 5 and FIG. 6, a generated load when a load is applied from the vehicle front side is smaller at the vehicle rear side relative to the front end portion 16A of the roof panel 16 than at the vehicle front side, the opposite side of the front end portion 16A. Consequently, a generated moment is also smaller at the vehicle rear side (with a decreasing trend). Therefore, during a front collision of the vehicle 12, an occurrence of pillar-bending from the first joining portion 82 and the second joining portion 84 may be suppressed (endurance of the A pillar 20 may be improved) even at the first joining portion 82 and second joining portion 84 at which stresses tend to concentrate.

The same applies in a mode in which the bracket 76 is provided connecting the front column 30 with the rear column 40, as shown in FIG. 4. That is, the bracket 76 is provided at a location at which at least the rear end portion 76A overlaps in plan view with the front end portion 16A of the roof panel 16 in the vehicle front-and-rear direction, and the first joining portion 82 and second joining portion 84 are formed at the vehicle rear side relative to the rear end portion 76A of the bracket 76.

Therefore, similarly to the above description, a generated load when a load is applied from the vehicle front side is smaller at the vehicle rear side relative to the rear end portion 76A of the bracket 76 than at the vehicle front side, the opposite side of the rear end portion 76A, and consequently a generated moment is smaller at the vehicle rear side (with a decreasing trend). In addition, stiffness at the upper end portion of the A pillar 20 may be improved by the bracket 76. Therefore, an occurrence of pillar-bending from the first joining portion 82 and the second joining portion 84 during a front collision of the vehicle 12 may be suppressed (endurance of the A pillar 20 may be further improved).

As shown in FIG. 1, in the front pillar structure 10 according to the present exemplary embodiment, the first joining portion 82 and second joining portion 84 are formed at the vehicle front side relative to the upper end edge portion 80A of the B pillar 80. In other words, the first joining portion 82 and second joining portion 84 are formed between the front end portion 16A of the roof panel 16 or rear end portion 76A of the bracket 76 and the upper end edge portion 80A of the B pillar 80.

Accordingly, lengths of the front column 30 and the rear column 40 may be reduced compared to, for example, a structure in which the first joining portion 82 and second joining portion 84 are formed at the vehicle rear side relative to the upper end edge portion 80A of the B pillar 80 (i.e., the front column 30 and rear column 40 are elongated to the vehicle rear side beyond the upper end edge portion 80A of the B pillar 80). Thus, an increase in weight of the vehicle 12 may be suppressed.

As mentioned above, it is preferable if the first joining portion 82 and the second joining portion 84 are formed at a substantially central portion in the vehicle front-and-rear direction of the rail outer panel 24 (a substantial middle position) between the front end portion 16A of the roof panel 16 or rear end portion 76A of the bracket 76 and the upper end edge portion 80A of the B pillar 80 (see FIG. 1). According to this structure, a good balance may be found between suppressing an occurrence of pillar-bending from the first joining portion 82 and second joining portion 84 and suppressing an increase in weight of the vehicle 12.

The A pillar 20 structuring the front pillar structure 10 according to the present exemplary embodiment is provided with the transparent A pillar glass 50. Therefore, a benefit is provided in that a driver (a vehicle occupant) may view conditions at the outer side of the A pillar 20 through the A pillar glass 50 between the front side pillar garnish 60 (the front column 30) and the rear side pillar garnish 70 (the rear column 40).

Hereabove, the front pillar structure 10 according to the present exemplary embodiment has been described in accordance with the attached drawings. However, the front pillar structure 10 according to the present exemplary embodiment is not limited to the illustrated structure; suitable design modifications may be applied within a scope not departing from the gist of the present disclosure. For example, the numbers of spot welds constituting the first joining portion 82 and the second joining portion 84 are not limited to the illustrated numbers.

What is claimed is:

1. A front pillar structure comprising:
   a front side pillar frame member and a rear side pillar frame member that structure a front pillar;
   a transparent member that spans between the front side pillar frame member and the rear side pillar frame member and structures the front pillar;
   a first joining portion at which an upper end portion of the front side pillar frame member is joined to a roof side rail that is disposed at a vehicle width direction outer side of a roof panel; and
   a second joining portion at which an upper end portion of the rear side pillar frame member is joined to the roof side rail, wherein the first joining portion and the second joining portion are formed at the vehicle rear side relative to a front end portion of the roof panel,
   wherein the first joining portion is at a different location from the second joining portion.

2. The front pillar structure according to claim 1, wherein the first joining portion and the second joining portion are formed at the vehicle front side relative to an upper end edge portion at the vehicle front side of a center pillar.

3. The front pillar structure according to claim 1, wherein the first joining portion and the second joining portion are formed at a substantially central portion in the vehicle front-and-rear direction of the roof side rail between the front end portion of the roof panel and an upper end edge portion at the vehicle front side of a center pillar.

4. A front pillar structure comprising:
   a front side pillar frame member and a rear side pillar frame member that structure a front pillar;
   a transparent member that spans between the front side pillar frame member and the rear side pillar frame member and structures the front pillar;
   a first joining portion at which an upper end portion of the front side pillar frame member is joined to a roof side rail that is disposed at a vehicle width direction outer side of a roof panel;
   a second joining portion at which an upper end portion of the rear side pillar frame member is joined to the roof side rail; and
   a connecting member that connects the front side pillar frame member with the rear side pillar frame member, at a location at which at least a vehicle rear side end portion of the connecting member overlaps in the vehicle front-and-rear direction with a front end portion of the roof panel, wherein the first joining portion and the second joining portion are formed at the vehicle rear side relative to the connecting member,
   wherein the first joining portion is at a different location from the second joining portion.

5. The front pillar structure according to claim 4, wherein the first joining portion and the second joining portion are formed at the vehicle front side relative to an upper end edge portion at the vehicle front side of a center pillar.

6. The front pillar structure according to claim 4, wherein the first joining portion and the second joining portion are formed at a substantially central portion in the vehicle front-and-rear direction of the roof side rail between the connecting member and an upper end edge portion at the vehicle front side of a center pillar.

7. The front pillar structure according to claim 1, wherein the first joining portion is above the second joining portion.

8. The front pillar structure according to claim 4, wherein the first joining portion is above the second joining portion.

9. The front pillar structure according to claim 4, wherein the front and rear side pillar frame members and the connecting member define an A-shape.

* * * * *